(12) United States Patent
Anderson et al.

(10) Patent No.: US 8,793,002 B2
(45) Date of Patent: Jul. 29, 2014

(54) TORQUE LOAD CONTROL SYSTEM AND METHOD

(75) Inventors: Randall T. Anderson, Peoria, IL (US); Corey L. Gorman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1273 days.

(21) Appl. No.: 12/213,527

(22) Filed: Jun. 20, 2008

(65) Prior Publication Data

US 2009/0319136 A1   Dec. 24, 2009

(51) Int. Cl.
*G06F 17/00* (2006.01)
*G05B 13/02* (2006.01)

(52) U.S. Cl.
USPC ............................................. 700/28; 701/54

(58) Field of Classification Search
USPC ............. 700/28, 52; 701/51, 53, 54; 477/107, 477/109, 110
See application file for complete search history.

(56) References Cited

U.S. PATENT DOCUMENTS

| | | |
|---|---|---|
| 3,795,107 A | 3/1974 | Ward |
| 3,803,841 A | 4/1974 | Erickson et al. |
| 3,914,938 A | 10/1975 | Cornell et al. |
| 3,946,560 A | 3/1976 | MacIntosh et al. |
| 4,019,596 A | 4/1977 | Crull |
| 4,085,812 A | 4/1978 | Robinson et al. |
| 4,086,767 A | 5/1978 | Byers, Jr. |
| 4,126,994 A | 11/1978 | Rockwell |
| 4,165,613 A | 8/1979 | Bernhoft et al. |
| 4,399,886 A | 8/1983 | Pollman |
| 4,400,935 A | 8/1983 | Louis |
| 4,465,942 A | 8/1984 | Deicke |
| 4,606,005 A | 8/1986 | Ribbens |
| 4,689,955 A | 9/1987 | Lietzke |
| 4,739,616 A | 4/1988 | Myers |
| 4,934,985 A | 6/1990 | Strubbe |
| 5,103,692 A * | 4/1992 | Shimanaka et al. .......... 477/109 |
| 5,203,168 A | 4/1993 | Oshina et al. |
| 5,270,578 A | 12/1993 | Yamamura |
| 5,416,702 A | 5/1995 | Kitagawa et al. |
| 5,447,029 A | 9/1995 | Swick et al. |
| 5,453,930 A * | 9/1995 | Imaseki et al. ................. 701/22 |
| 5,496,227 A | 3/1996 | Minowa et al. |
| 5,577,474 A | 11/1996 | Livshiz et al. |
| 5,826,208 A * | 10/1998 | Kuroiwa et al. ............... 701/54 |
| 5,845,221 A | 12/1998 | Hosokawa et al. |
| 6,018,694 A * | 1/2000 | Egami et al. .................. 701/102 |
| 6,052,638 A * | 4/2000 | Genise ............................. 701/53 |
| 6,186,925 B1 * | 2/2001 | Bellinger ...................... 477/175 |
| 6,217,479 B1 | 4/2001 | Brown et al. |
| 6,371,081 B1 * | 4/2002 | Hawkins et al. .............. 123/352 |

(Continued)

FOREIGN PATENT DOCUMENTS

| | | |
|---|---|---|
| JP | 2005/186788 | 7/2005 |
| WO | 02087053 | 10/2002 |

*Primary Examiner* — Charles Kasenge
(74) *Attorney, Agent, or Firm* — Finnegan, Henderson, Farabow, Garrett & Dunner LLP

(57) ABSTRACT

A machine may include a torque producing system, and a torque consuming device including load controls operable to generate a request for torque. The machine may also include a control system coupled to the torque producing system and the load controls. The control system may be operable to receive the request for torque, determine a torque limit based on the requested torque, and communicate the torque limit to the load controls, the load controls being operable to adjust operation of the torque consuming device based on the torque limit.

17 Claims, 5 Drawing Sheets

(56) References Cited

U.S. PATENT DOCUMENTS

| | | | | |
|---|---|---|---|---|
| 6,377,884 | B1 | 4/2002 | Loeffler et al. | |
| 6,434,469 | B1 * | 8/2002 | Shimizu et al. | 701/84 |
| 6,440,041 | B1 * | 8/2002 | Riedle et al. | 477/107 |
| 6,472,772 | B2 | 10/2002 | Onizuka et al. | |
| 6,508,739 | B1 * | 1/2003 | Bellinger | 477/62 |
| 6,523,525 | B1 * | 2/2003 | Hawkins | 123/491 |
| 6,536,402 | B2 | 3/2003 | Houchin et al. | |
| 6,581,565 | B2 | 6/2003 | Heslop et al. | |
| 6,675,577 | B2 | 1/2004 | Evans | |
| 6,700,386 | B2 | 3/2004 | Egami | |
| 6,704,638 | B2 | 3/2004 | Livshiz et al. | |
| 6,722,332 | B2 * | 4/2004 | Kojima | 123/179.3 |
| 6,807,474 | B2 | 10/2004 | Bergqvist et al. | |
| 6,819,997 | B2 | 11/2004 | Buchanan et al. | |
| 6,842,686 | B2 | 1/2005 | Homeyer et al. | |
| 6,859,711 | B2 | 2/2005 | Eckert et al. | |
| 6,986,398 | B2 | 1/2006 | Obayashi | |
| 7,001,306 | B2 * | 2/2006 | Suzuki | 477/4 |
| 7,034,476 | B2 * | 4/2006 | Wang et al. | 318/139 |
| 7,089,104 | B2 * | 8/2006 | Post et al. | 701/84 |
| 7,098,555 | B2 | 8/2006 | Glahn et al. | |
| 7,115,067 | B2 * | 10/2006 | Tashiro | 477/83 |
| 7,137,347 | B2 | 11/2006 | Wong et al. | |
| 7,146,263 | B2 | 12/2006 | Guven et al. | |
| 7,151,991 | B2 * | 12/2006 | Iida | 701/69 |
| 7,163,487 | B2 * | 1/2007 | Tao et al. | 477/3 |
| 7,171,299 | B1 * | 1/2007 | Stroh | 701/110 |
| 7,240,487 | B2 | 7/2007 | Diaz et al. | |
| 7,260,931 | B2 | 8/2007 | Egelja et al. | |
| 7,306,542 | B2 * | 12/2007 | Bauerle et al. | 477/118 |
| 7,308,352 | B2 * | 12/2007 | Wang et al. | 701/70 |
| 7,310,943 | B2 | 12/2007 | Burgart et al. | |
| 7,330,779 | B2 * | 2/2008 | Schulz | 700/282 |
| 7,434,893 | B2 * | 10/2008 | Sabelstrom et al. | 303/3 |
| 7,440,832 | B2 * | 10/2008 | Steen et al. | 701/51 |
| 7,698,048 | B2 * | 4/2010 | Jung et al. | 701/103 |
| 7,935,015 | B2 * | 5/2011 | Tabata et al. | 475/5 |
| 8,195,370 | B2 * | 6/2012 | Simon et al. | 701/54 |
| 8,437,938 | B2 * | 5/2013 | Whitney et al. | 701/93 |
| 2002/0050259 | A1 * | 5/2002 | Kojima | 123/179.3 |
| 2004/0124703 | A1 | 7/2004 | Tani et al. | |
| 2004/0267436 | A1 | 12/2004 | Prodi et al. | |
| 2005/0057208 | A1 | 3/2005 | Seibel et al. | |
| 2005/0171669 | A1 | 8/2005 | Sato | |
| 2005/0192154 | A1 * | 9/2005 | Sakamoto et al. | 477/109 |
| 2006/0116806 | A1 * | 6/2006 | Steen et al. | 701/51 |
| 2006/0289211 | A1 * | 12/2006 | Mashiki | 180/65.2 |
| 2006/0293149 | A1 * | 12/2006 | Landes | 477/181 |
| 2007/0005205 | A1 | 1/2007 | Bernardi et al. | |
| 2007/0141999 | A1 | 6/2007 | Przywecki | |
| 2008/0125929 | A1 * | 5/2008 | Prokhorov | 701/29 |
| 2009/0024263 | A1 * | 1/2009 | Simon et al. | 701/22 |
| 2009/0182478 | A1 * | 7/2009 | Whitney et al. | 701/93 |

\* cited by examiner

TORQUE LOAD CONTROL SYSTEM AND METHOD

TECHNICAL FIELD

The present disclosure relates to a torque load control system and method, and, more particularly, to a method and system for determining torque load limits and compensating for torque error.

BACKGROUND

A machine, for example, an engine, a generator, or a vehicle, may include one or more sources of power. Power sources may include engines, batteries, and any other suitable energy generating or energy storage devices. The machine may also include powered devices that may run using power generated or otherwise supplied by the power source. During operation of the machine, multiple powered devices may request power from the power source. As the load or power requested from the power source begins to increase, the power source may begin to operate at a lower speed. If the power source speed falls below a threshold speed, the power source may be susceptible to stalling.

Stalling may result in machine downtime and decreased efficiency. By setting limits on machine operation so that the power source speed does not fall below the threshold speed, stalling may be avoided. However, speed or acceleration based control systems that are used to control machine operation may be inefficient due to delayed response times. Further, if the limits that are set are based on inaccurate readings or values, or some other source of error, then the effectiveness of those limits in preventing stalling may be reduced. Accounting for error may improve the accuracy of the limits, and may help to ensure that stalling and related problems will occur less frequently or not at all.

One attempt to control machine operation is described in U.S. Pat. No. 7,146,263 B2 to Guven et al. ("Guven"). Guven discloses a method for predictive load management. In Guven, a control system is operable to receive at least one input indicative of a load on a transmission and to identify a desired load of the transmission based on the at least one input. The control system is also operable to receive at least one input indicative of current power output of a power source. The control system limits the desired transmission load applied to the driven member of the transmission based on the current power output of the power source to thereby prevent the power source from operating outside of the desired operating range. However, the method in Guven may be inefficient.

The disclosed system and method is directed at overcoming one or more of the problems set forth above.

SUMMARY

According to one aspect of this disclosure, a machine is provided. The machine may include a torque producing system. The machine may also include a torque consuming device including load controls operable to generate a request for torque. The machine may also include a control system coupled to the torque producing system and the load controls. The control system may be operable to receive the request for torque, determine a torque limit based on the requested torque, and communicate the torque limit to the load controls, the load controls being operable to adjust operation of the torque consuming device based on the torque limit.

According to another aspect of this disclosure, a machine is provided. The machine may include a torque producing system. The machine may also include one or more torque consuming devices capable of consuming torque in excess of a rated capacity of the torque producing system. The machine may also include a control system coupled to the torque producing system and the one or more torque consuming devices. The control system may include a torque load control operable to limit operation of the one or more torque consuming devices to prevent exceeding of the rated capacity of the torque producing system.

According to another aspect of this disclosure, a machine is provided. The machine may include a torque producing system operable within a range of operating speeds. The machine may also include a torque consuming device operable to generate a signal requesting torque from the torque producing system. The machine may also include a control system coupled to the torque producing system and the torque consuming device. The control system may be operable to maintain the torque producing system at a target operating speed as the torque requested varies by controlling torque consumed by the torque consuming device based on the torque requested and one or more additional machine operating parameters.

According to another aspect of this disclosure, a machine is provided. The machine may include a torque producing system. The machine may also include one or more torque consuming devices operable to exert a torque load on the torque producing system. The machine may also include a control system coupled to the torque producing system and the one or more torque consuming devices. The control system may include a torque error estimator, and one or more electronic devices. The one or more electronic devices may be operable to sense operating conditions of the torque producing system and the one or more torque consuming devices. The one or more electronic devices may also be operable to provide torque data to the control system based on the sensed operating conditions. The torque error estimator may be operable to compensate for error in the torque data.

According to another aspect of this disclosure, an electronic control module is provided. The electronic control module may include instructions for performing a method. The method may include obtaining input signals related to at least one of a torque producing system and a torque consuming device. The method may also include calculating an initial error value indicative of error associated with at least one of the torque producing system and the torque consuming device based on the input signals. The method may also include subtracting a feedback value from the initial error value to calculate a modified error value. The method may also include adjusting the modified error value to produce an adjusted error value used to control operation of at least one of the torque producing system and the torque consuming device.

According to another aspect of this disclosure, a method for machine modification is provided. The method may include modifying a machine that includes a torque producing system to include a torque consuming device coupled to controls operable to provide a torque request signal based on operating parameters of the torque consuming device. The method may also include modifying the machine to include a torque load control configured to determine a torque load limit for the torque producing system. The machine may operate at least one of the torque producing system and the torque consuming device based on the torque load limit and the torque request signal.

According to another aspect of this disclosure, a method for modifying a machine is provided. The machine may include a torque producing system, and a torque consuming device coupled to controls operable to provide a torque request signal. The method may include modifying a control system of the machine to include a torque load control operable to determine a torque load limit for the torque producing system. The method may also include modifying the control system to control an operation of at least one of the torque producing system and the torque consuming device based on the torque load limit and the torque request signal.

According to another aspect of this disclosure, a machine is provided. The machine may include a torque producing system. The machine may also include torque consuming devices operable to exert a torque load on the torque producing system. The machine may also include a control system operable to determine a torque load limit for the torque producing system. The control system may be in communication with the torque producing system. The control system may also be communicatively linked to one or more first torque consuming devices. The control system may also be uncommunicative with one or more second torque consuming devices. The control system may also be operable to calculate torque consumed by the one or more first torque consuming devices based at least in part on communications from the one or more first torque consuming devices. The control system may also be operable to calculate torque consumed by the one or more second torque consuming devices based on sensed operating conditions of the machine.

According to another aspect of this disclosure, an electronic control module is provided. The electronic control module may include instructions for performing a method. The method may include determining an amount of available torque currently available from a torque producing system. The method may also include determining a torque load limit for the torque producing system based on the determined amount of available torque currently available and an operating speed of the torque producing system. The method may also include determining the torque load limit in a manner to prevent the operating speed from decaying at a rate greater than a target deceleration rate. The method may also include controlling one or more torque consuming devices that receive torque from the torque producing system based on the torque load limit.

DETAILED DESCRIPTION

Figure 1:
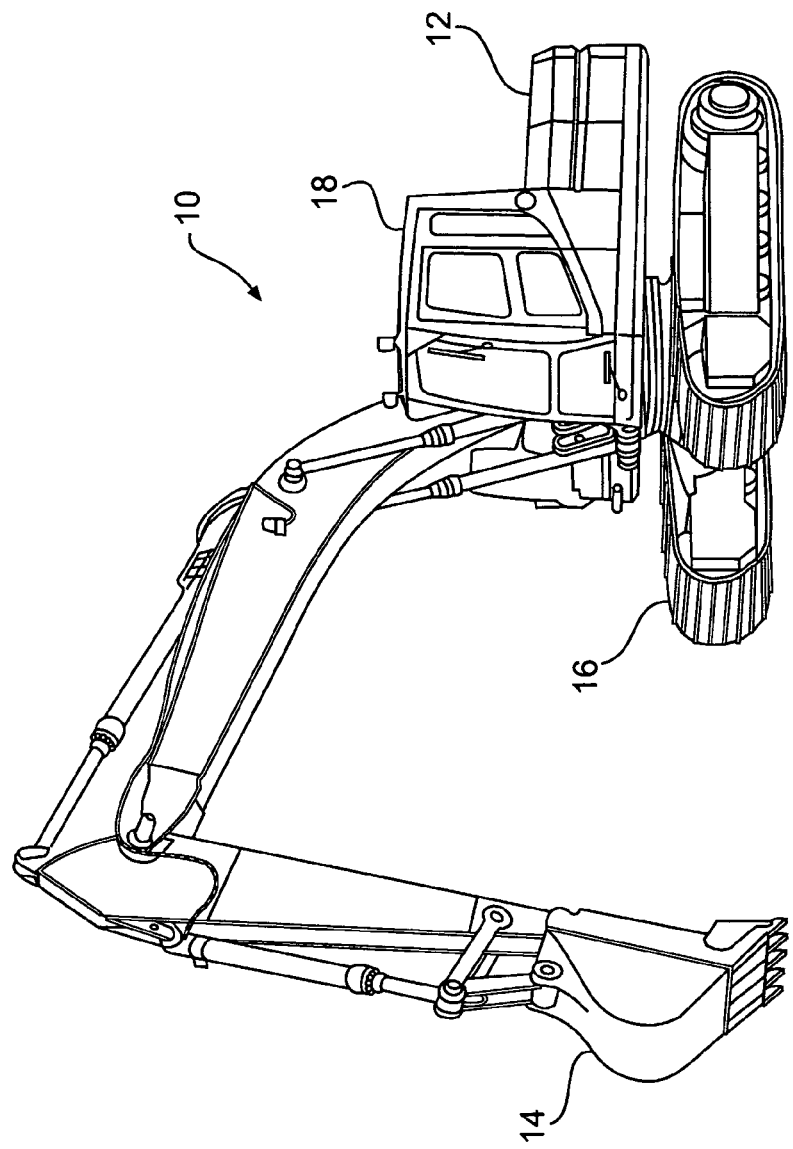
FIG. 1 is an illustration of an exemplary machine.
Figure 2:
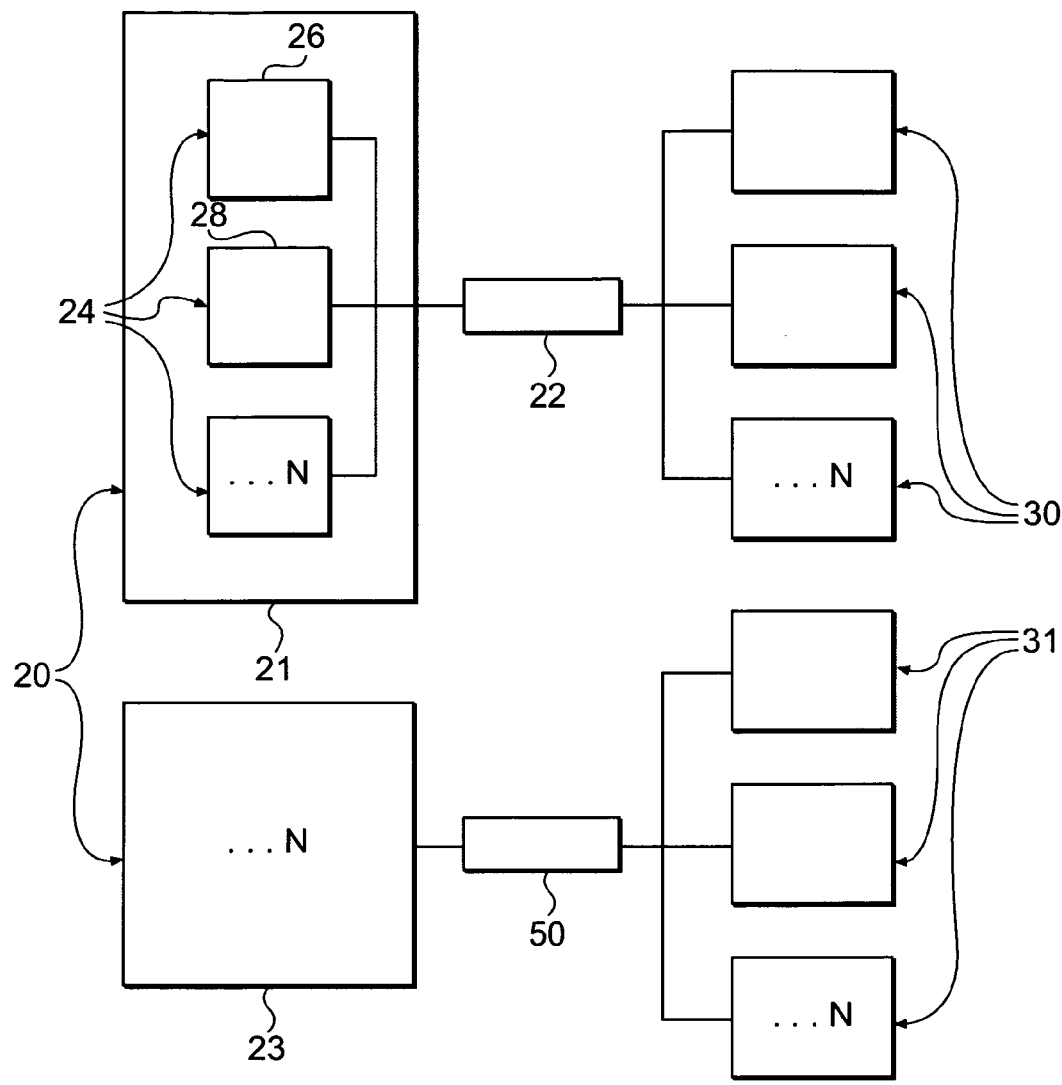
FIG. 2 is a schematic of exemplary machine elements, according to one aspect of the disclosure.

According to one aspect of this disclosure, an exemplary machine 10 is shown in FIG. 1. Machine 10 may include, for example, a main body 12, an implement 14, a ground engaging device 16, a cab 18, and/or any other suitable machine components that are known in the art. As shown in FIG. 2, machine 10 may also include one or more torque producing systems 20. A torque producing system 21 may be configured to rotate an output 22, for example a rotating shaft, and may include one or more torque producing devices 24, for example, an engine 26. Engine 26 may include an internal combustion engine configured to combust fuel, such as gasoline, diesel fuel, or gaseous fuel. The structure of internal combustion engines and the details of their operation are commonly known in the art. The internal combustion engine may combust fuel in one or more combustion chambers to drive linear movement of one or more pistons. The one or more pistons may be coupled by a connecting rod to output 22 to transmit the linear piston motion to output 22, thereby converting linear piston motion to rotary motion of output 22. In this manner, the internal combustion engine delivers torque to output 22. The power of engine 26 may be expressed as the product of the torque delivered to output 22 multiplied by an angular speed of output 22. The angular speed of output 22 may be related to engine speed. As engine speed increases, the angular speed of output 22 may also increase. A decrease in engine speed may produce a corresponding decrease in the angular speed of output 22.

Machine 10 may also include one or more torque consuming devices 30. Torque consuming devices 30 may include any devices on machine 10 configured to transform an input, such as torque from output 22, into an output, such as movement of ground engaging device 16, implement 14, and/or any other change in the state of machine 10. Ground engaging device 16 may include a wheel assembly, track type device, and/or any other suitable ground engaging device. Implement 14 may include a blade, scraper, bucket, gripping device, and/or any other suitable implement. Torque consuming devices 30 of machine 10 may include, for example, a drive pump, an implement pump, a cooling system, an auxiliary pump, and an air-conditioning system (all not shown). The "... N" notation indicates that torque consuming devices 30 may include additional, fewer, and/or different components than those listed above, as the components listed above are exemplary. Further, torque consuming devices 30 may be components of a drive system, hydraulic actuation system, fan assembly, transmission, and/or any other suitable system found in machines. Torque producing devices 24, output 22, and torque consuming devices 30 may have rotational inertia. The rotational inertia of these elements may contribute to the total rotational inertia of torque producing system 21.

Torque producing system 21 may also include another torque producing device, for example, an auxiliary device 28. Auxiliary device 28 may include a secondary engine, an electric motor with a battery, a hydraulic motor with a hydraulic accumulator, and/or any other suitable power source. Auxiliary device 28 may be configured to generate, store, accumulate, and/or distribute torque. Auxiliary device 28, like engine 26, may be operatively coupled to output 22, such that auxiliary device 28 may help rotate output 22. As such, auxiliary device 28 may deliver torque to output 22 on top of that produced by engine 26. The angular speed of output 22 may relate to auxiliary device speed (speed of output 22). That is, as auxiliary device speed increases, the angular speed of output 22 may also increase. A decrease in auxiliary device speed may produce a decrease in the angular speed of output 22. Like engine 26 and output 22, auxiliary device 28 may have rotational inertia.

Machine 10 may include additional, fewer, and/or different torque producing systems 20. It should be understood that machine may include any suitable torque producing system or combination of torque producing systems known in the art. The "... N" notation associated with a torque producing system 23 indicates that additional, fewer, and/or different torque producing systems may be included. Furthermore, each of torque producing systems 20 may include additional, fewer, and/or different torque producing devices known in the art. This variability is represented by the " . . . N" notation shown in torque producing system 21. Torque producing system 23 may provide one or more torque consuming devices 31 with torque. The " . . . N" notation indicates that torque consuming devices 31 may include additional, fewer, and/or different components.

Since torque producing system 21 may include a single output 22, such that torque producing devices 24 in torque producing system 21 may rotate the same output 22, the torque delivered by torque producing system 21 may equal the sum of the torques that torque producing devices 24 deliver individually. Further, the rotational inertia for torque producing system 21 may include the sum of the individual rotational inertias of torque producing devices 24. Furthermore, the speed of rotation of output 22 may be indicative of the torque producing system speed.

Since torque consuming devices 30 may take torque from output 22 as it is rotated by torque producing system 21, torque consuming devices 30 may act as a torque load on torque producing system 21. The torque requirements of torque consuming devices 30 may be relatively constant, or may vary over time depending on the operations being performed. The torque load on torque producing system 21 may change when the torque requirements of torque consuming devices 30 change.

As torque consuming devices 30 take or use torque from output 22, they may have an effect on torque producing system 21. When the torque required by torque consuming devices 30 increases, the torque load on output 22 of torque producing system 21 increases. The increase in torque load may slow the angular speed of output 22, and thus, the speed of torque producing system 21 may decrease. The decrease may produce a corresponding decrease in the speed of at least one of torque producing devices 24. For example, when the torque load on output 22 increases, engine speed may decrease. Engine 26 may have an underspeed set point. The engine underspeed set point may be an engine speed under which engine stalling may be a problem. As a preventative measure, engine 26 may be kept at speeds above the engine underspeed set point.

When the torque load on output 22 increases, auxiliary device speed may also decrease. Auxiliary device 28 may also have an underspeed set point. The auxiliary device underspeed set point may be an auxiliary device speed under which stalling may become a problem. Thus, as a preventative measure, auxiliary device 28 may be kept at speeds at or above the auxiliary device underspeed set point.

Torque producing system 21 may have an underspeed set point, expressed in terms of a torque producing system speed (e.g., the speed of output 22). The torque producing system underspeed set point may take into account the underspeed set points of torque producing devices 24 that make up torque producing system 21. For example, the torque producing system underspeed set point may be defined by two values, namely the engine underspeed set point and the auxiliary device underspeed set point. Alternatively, the torque producing system underspeed set point may be defined by a single value, for example, the higher of the engine underspeed set point and the auxiliary device underspeed set point, so that at speeds above the torque producing system underspeed set point, neither engine 26 or auxiliary device 28 may be susceptible to stalling. Alternatively still, the torque producing system underspeed set point may be the lower of the engine underspeed set point and the auxiliary device underspeed set point, so that while the one with the higher underspeed set point may be susceptible to stalling, the one with the lower underspeed set point will not be, ensuring that at least one of engine 26 or auxiliary device 28 may continue to produce torque. It is also contemplated, that a torque producing system underspeed set point may be an average of underspeed set points of all torque producing devices that are included in a torque producing system. The torque producing system underspeed set point may be defined as the speed of output 22 at or above which stalling of torque producing devices 24 in torque producing system 21 should not pose a problem. Additionally or alternatively, the torque producing system underspeed set point may be defined as the speed of output 22 that may ensure that machine operation and/or machine performance will not be degraded.

The underspeed set point may be used in determining a limit, such as a torque load limit, for torque producing system 21. The torque load limit may be indicative of a torque load that can be placed on torque producing system 21 without causing the speed of torque producing system 21 to fall below its underspeed set point. Adjusting the operational parameters of machine 10 and/or the torque load on output 22 based on the torque load limit may make torque producing system 21 less susceptible to stalling.

Figure 3:
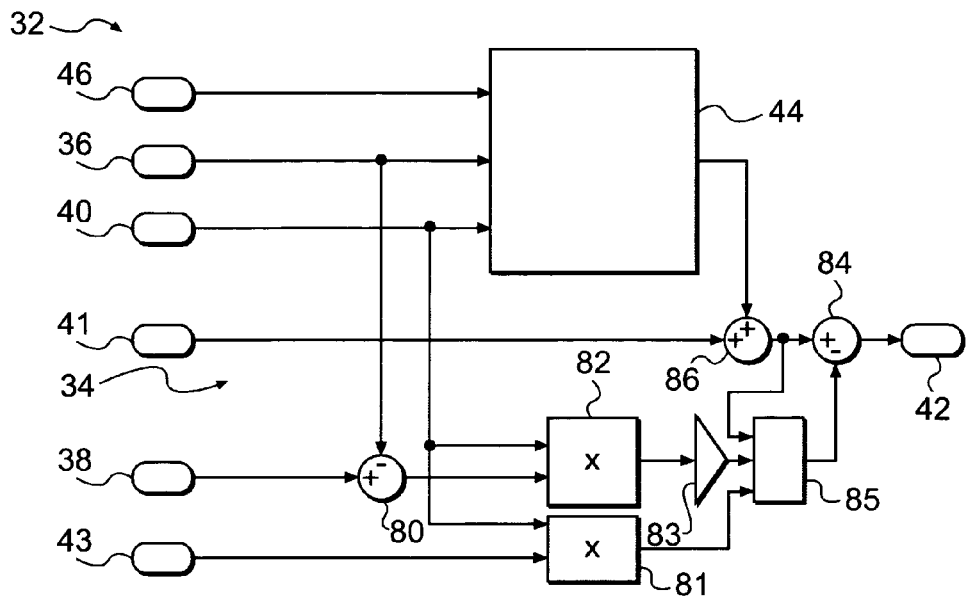
FIG. 3 is a control system schematic, according to another aspect of the disclosure.

Machine 10 may include a control system 32, shown in FIG. 3, configured to determine, set, and/or adjust a torque load limit 42. Control system 32 may include one or more electronic devices (not shown) for sensing or measuring operational parameters of machine 10, including, for example, pressure and speed. The sensing devices may convert those operational parameters into electrical signals that may be communicated to an embedded controller (not shown). The embedded controller may process the electrical signals, thus converting them into digital signals. One or more computers (not shown) storing one or more software algorithms in memory, such as flash memory, random access memory, and/or any other suitable type of memory, may perform mathematical calculations based on the algorithms. This may result in production of an output. A current driver may convert the output into an electrical current. The current may be conducted through wires (not shown) to an electrical solenoid (not shown), which may be used to drive a mechanical component of machine 10, for example, ground engaging device 16 or implement 14. As the mechanical component operates, the operational parameters of machine 10 may change, and the sensing devices may sense or measure the change, and may repeat the process described above continuously and/or repeatedly during machine operation.

Control system 32 may include a torque load control 34. Torque load control 34 may receive one or more inputs. For example, torque load control 34 may receive a torque producing system speed 36, a torque producing system underspeed set point 38, a torque producing system rotational inertia 40, an available torque 41 indicative of torque that torque producing system 21 could provide at the current rotational speed, a deceleration limit 43, and/or any other suitable inputs. The inputs may include values and/or signals. Using those inputs, control system 32 may perform one or more calculations to arrive at an output. That output may include torque load limit 42. Control system 32 may use torque load limit 42 to control the operation of machine 10.

In some cases, there may be error in the input values and/or determined values that may give rise to error in the value arrived at for torque load limit 42. One possible source of error relates to communication, or lack thereof, between control system 32 and one or more torque consuming devices 30. If, for example, control system 32 is unaware that one of torque consuming devices 30 is consuming an amount of torque, control system 32 may not take that consumed torque into account when determining torque load limit 42. If electronic devices for sensing operational parameters of torque consuming devices 30 produce inaccurate data, this may also introduce error. In such cases, the determined torque load limit may exceed the true torque load limit. If torque load limit 42 increases to the determined torque load limit instead of being restricted according to the true torque load limit, engine 26 and/or auxiliary device 28 may be susceptible to stalling. Aside from error associated with torque consuming devices 30, another possible source of error may include torque producing system 21. Control system 32 may receive inaccurate information regarding the amount of power that torque producing system 21 can provide. Compensating for one or both of these types of error may help to increase the accuracy achieved by control system 32.

Figure 4:
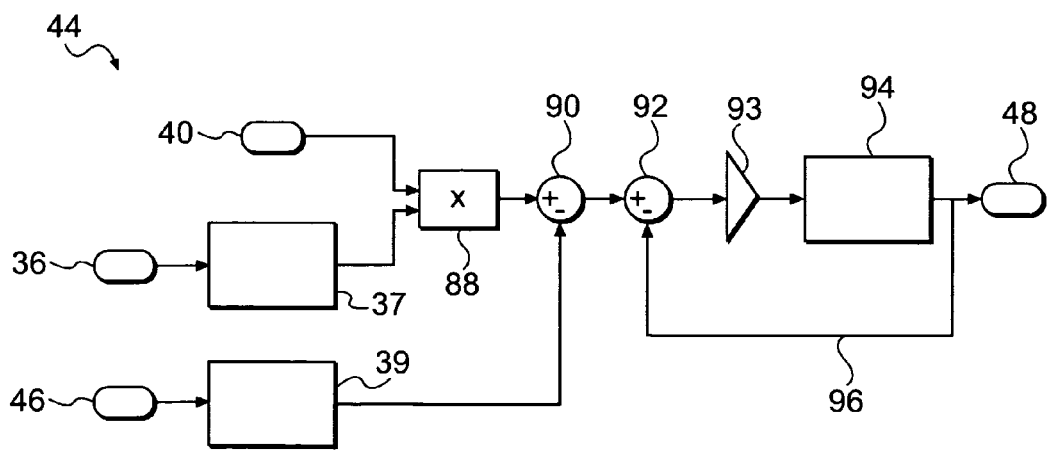
FIG. 4 is a control system schematic, according to yet another aspect of the disclosure.

In order to compensate for error when determining torque load limit 42, control system 32 may be provided with a torque error estimator 44, shown in FIG. 4. Torque error estimator 44 may receive one or more inputs or signals. For example, torque error estimator 44 may receive torque producing system speed 36, a torque sum 46 representative of the torque from torque producing system 21 minus torque loads associated with torque consuming devices 30, torque producing system rotational inertia 40, and/or any other suitable inputs. Using the inputs, torque error estimator 44 may perform one or more calculations to arrive at an output. That output may include a torque error 48. Control system 32 may use torque error 48 to make adjustments to torque load limit 42, thus compensating for error. Since torque sum 46 may be determined based on the amount of power that torque producing system 21 is providing, and the sum of the amounts of torque being used by torque consuming devices 30, then by using torque sum 46 in its calculations, torque error estimator 44 may compensate for error from torque producing system 21 as well as torque consuming devices 30.

Torque producing systems 20 may include their own individual outputs 22 and 50, torque producing devices 24, and torque consuming devices 30. In machines having multiple torque producing systems 20, control system 32 may determine torque load limit 42 and torque error 48 for each torque producing system individually.

Figure 6:
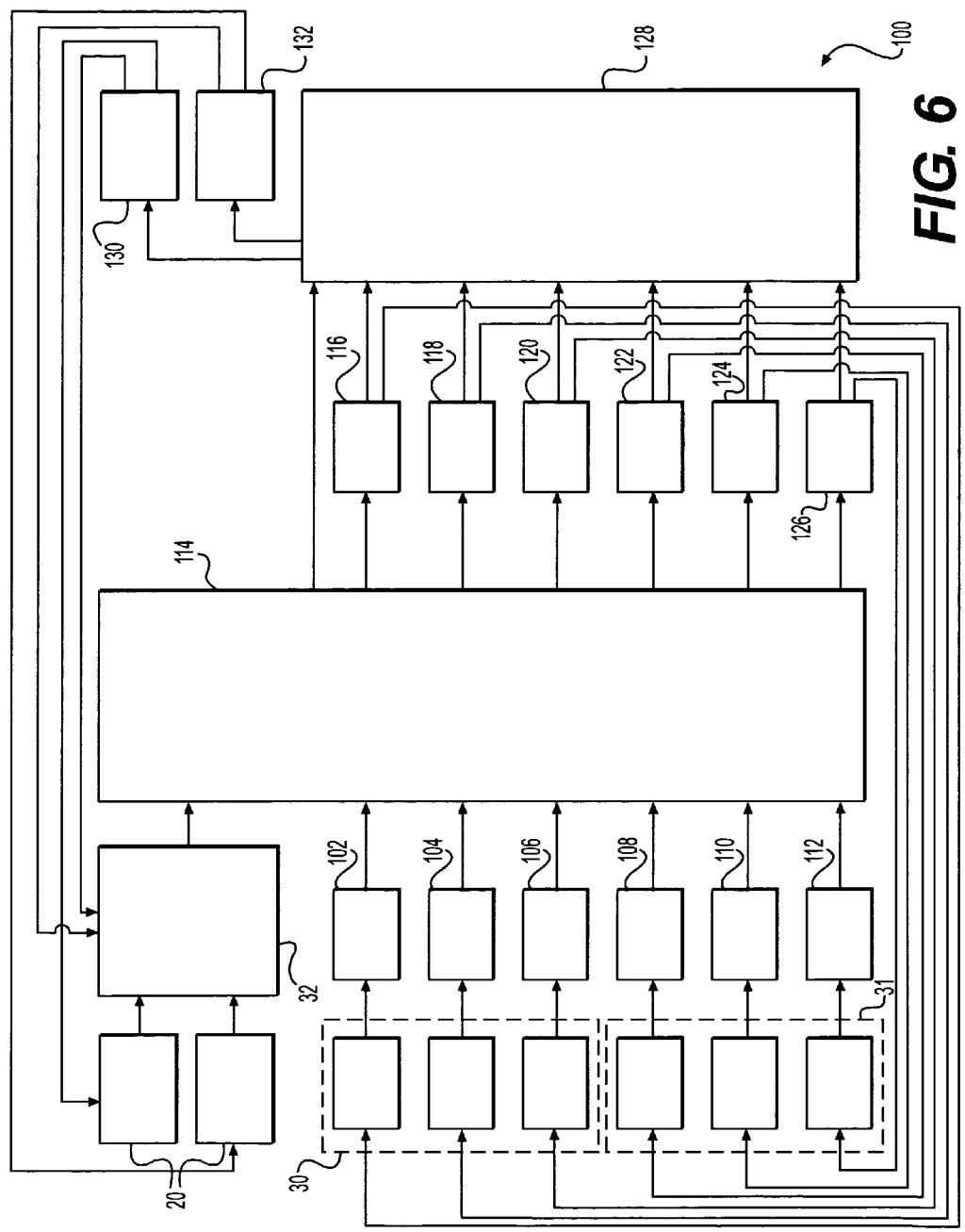
FIG. 6 is a control system schematic, according to yet another aspect of the disclosure.

FIG. 6 shows control system 32 among control elements 100. It is contemplated that control system 32 may be part of, or may include, features in control elements 100. Control elements 100 may include request modules 102, 104, 106, 108, 110, and 112, each corresponding to one of torque consuming devices 30 and 31. Request modules 102, 104, 106, 108, 110, and 112 may obtain inputs related to torque consuming device 30 and 31, including, for example, pressures, flow rates, current power usage, and/or expected power usage. The inputs may be in the form of signals generated by one or more electronic devices, such as sensors (not shown), monitoring torque consuming devices 30 and 31. The signals may also be generated by a machine operator through a control device, such as a joystick, steering wheel, accelerator pedal, or any other suitable control device. Based at least in part on the inputs, request modules 102, 104, 106, 108, 110, and 112 may generate requests for torque.

A power distribution module 114 may obtain torque load limit 42 from control system 32, as well as request signals from request modules 102, 104, 106, 108, 110, and 112. Power distribution module 114 may use torque load limit 42 and the request signals to allocate or distribute torque limits between torque consuming devices 30 and 31. Power distribution module 114 may do so by generating torque limit signals that may be sent to output command modules 116, 118, 120, 122, 124, and 126, each of which may correspond to one of torque consuming devices 30 and 31. Output command modules 116, 118, 120, 122, 124, and 126 may trigger the delivery of torque from torque producing systems 20 to torque consuming devices 30 and 31. Output command modules 116, 118, 120, 122, 124, and 126 may also control or adjust operation of torque consuming devices 30 and 31 in response to the torque limit. For example, if the torque limit for a torque consuming device is less than the torque requested by the torque consuming device, the output command module corresponding to that torque consuming device may delay or restrict operation of the torque consuming device until additional torque becomes available.

Output command modules 116, 118, 120, 122, 124, and 126 may also generate operating condition request signals, requesting for torque producing systems 20 to operate at one or more target operating conditions. A power generation control module 128 may obtain the operating condition request signals from output command modules 116, 118, 120, 122, 124, and 126. Power generation control module 128 may control or adjust the operating conditions of torque producing systems 20 based on the operating condition request signals. Power generation control module 128 may do so by generating power generation control request signals that may be sent to torque producing system control modules 130 and 132. Torque producing system control modules 130 and 132 may control or adjust the operating conditions of torque producing systems 20 based on the power generation control request signals. The operating conditions of torque producing systems 20 may be input into control system 32.

Figure 5:
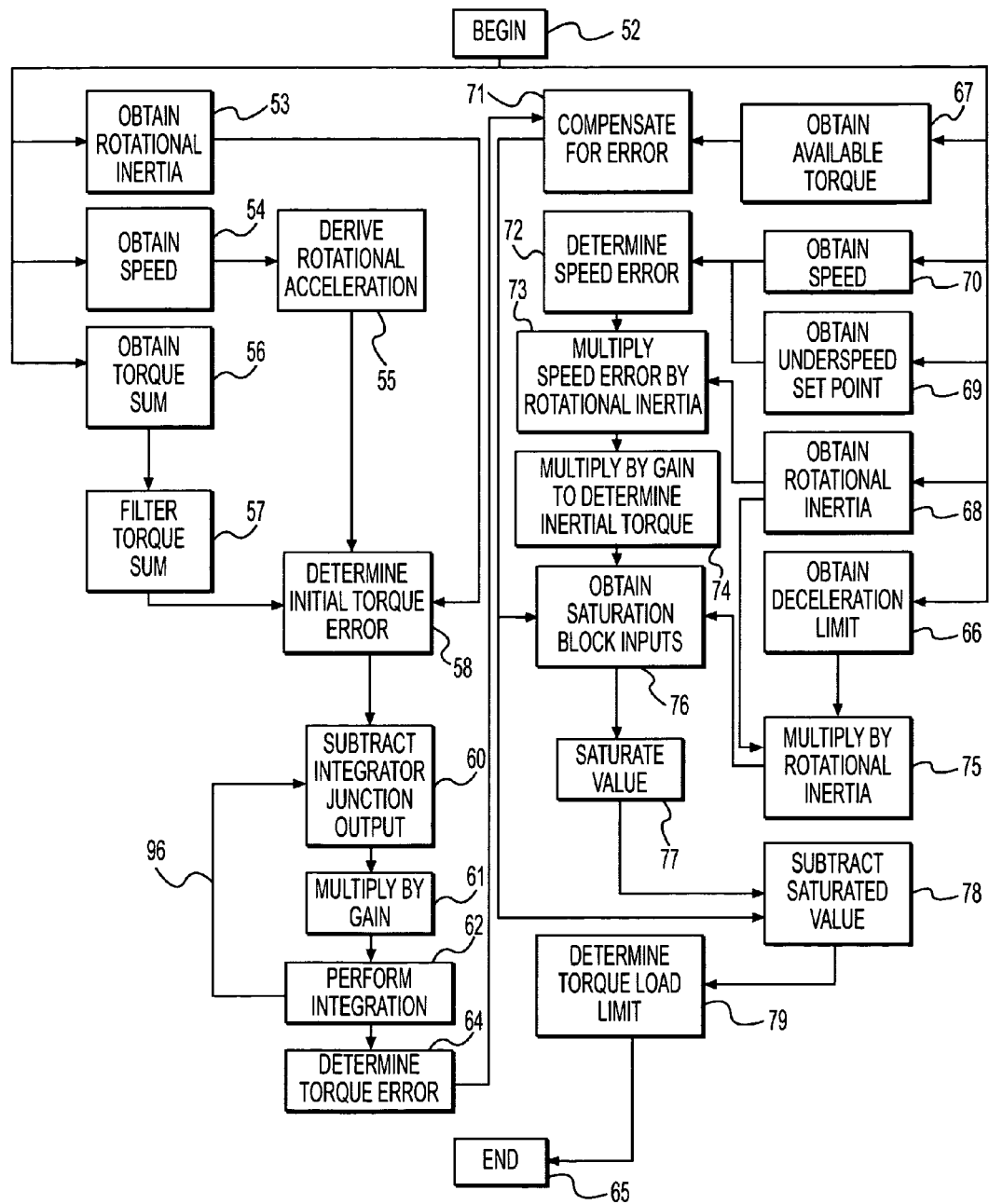
FIG. 5 is a flow diagram of a method according to yet another aspect of the disclosure.

In order to determine torque error 48 and continually update torque error 48, control system 32 may perform an exemplary method 51 shown in FIG. 5. The steps may begin when machine 10 is started (step 52). The steps may include obtaining input signals or values, including torque producing system rotational inertia 40 (step 53) and torque producing system speed 36 (step 54), and taking a filtered derivative of torque producing system speed 36 using filtered derivative junction 37 (step 55). Torque producing system speed 36 may be noisy, or in other words, may have signal noise associated with it. Thus, a derivative of torque producing system speed 36 may also be noisy if left unfiltered. By filtering the derivative of torque producing system speed 36 using filtered derivative junction 37, torque producing system acceleration may be found, while signal noise may be decreased.

Control system 32 may also obtain torque sum 46 (step 56). A filter 39, for example, a low pass filter, may be used to reduce noise associated with torque sum 46 (step 57). It is contemplated that filter 39 and filtered derivative junction 37 may have the same or similar response frequencies, or response bandwidth, for consistency. Torque error estimator 44 may determine an initial torque error value (step 58) by multiplying the filtered derivative of torque producing system speed 36 (i.e., acceleration) by torque producing system rotational inertia 40 at a multiplication block 88, and then subtracting torque sum 46 from that value at a summation junction 90. The initial torque error value in summation junction 90 may be zero if no error exists. However, in most circumstances, at least some error may exist or develop over time, and so often times, the value in summation junction 90 will be non-zero.

When machine 10 is started, the output of an integrator 94 may be zero. If error exists, the value in summation junction 90 may be non-zero. The output of integrator 94 may be recognized as torque error 48, and thus, at start-up, torque error 48 may equal zero. At summation junction 92, the output of integrator 94 may be subtracted from the value in summation junction 90 (step 60), as the output of integrator 94, acting as a feedback value, is routed through feedback loop 96. Thus, at start-up, the value in summation junction 92 may be equal to the value in summation junction 90, since subtracting zero produces no change in the value in summation junction 90. The value in summation junction 90 may be multiplied by a gain value at gain junction 93 (step 61), where it may be amplified or decreased, depending on the desired response time for torque error estimator 44. The value, having been multiplied by the gain value, may be then undergo integration at integrator 94 (step 62). The output value from integrator 94 may no longer be zero, and may represent a new value for torque error 48 (step 64). The output value from integrator 94 may be fed back through feedback loop 96, and at summation junction 92, it may be subtracted from the value in summation junction 90 in an attempt to bring the value in summation junction 92 to zero, or at least closer to zero.

If the value in summation junction 90 remains constant, then the value in summation junction 92 will equal zero as the output value from integrator 94 is subtracted from the value in summation junction 90 at summation junction 92. However, if the value in summation junction 90 fluctuates, subtracting the output value from integrator 94 from the value in summation junction 90 may produce a non-zero value in summation junction 92. Still, any new non-zero value in summation junction 92, after being multiplied by a gain value in gain junction 93, and being integrated in integrator 94, may be fed back using feedback loop 96, where it may once again be subtracted out at summation junction 92, with the aim of bringing the value in summation junction 92 to zero. This process of determining values and then feeding them back using feedback loop 96 may repeat continuously during operation of machine 10. Thus, through the incorporation of feedback loop 96, torque error estimator 44 may provide an adaptive calculation of torque error 48 by using the product of torque producing system rotational inertia 40 and rotational acceleration of torque producing system 21, minus torque sum 46 and the previous value for torque error 48. The process may end (step 65) when machine 10 is turned off.

Method 51 may also includes steps for determining torque load limit 42 using control system 32. These features of method 51 will now be described with reference to FIGS. 3 and 5. Control system 32 may obtain input values, including, for example, deceleration limit 43 (step 66), available torque 41 (step 67), torque producing system rotational inertia 40 (step 68), torque producing system underspeed set point 38 (step 69), and torque producing system speed 36 (step 70). Control system 32 may compensate for error by adding torque error 48, determined at step 64, to available torque 41 (step 71) in a summation junction 86. The value in summation junction 86 may be received by a saturation block 85 (step 76).

Control system 32 may determine a speed error by subtracting torque producing system speed 36 from torque producing system underspeed set point 38 in a summation junction 80 (step 72). Control system 32 may determine an inertial torque by multiplying the speed error by torque producing system rotational inertia 40 in a multiplication block 82 (step 73), and by multiplying the output from multiplication block 82 by a gain value at gain junction 83 (step 74). If torque producing system speed 36 is greater than underspeed set point 38, the speed error will be a negative value, and thus, the inertial torque will be a negative value. If, on the other hand, torque producing system speed 36 is less than underspeed set point 38, the speed error will be a positive value, and thus, the inertial torque will be a positive value. The gain value may amplify the inertial torque, or de-amplify the inertial torque, depending on the magnitude of the gain value. By multiplying by a larger gain value, control system 32 may respond more quickly, or become more active. By multiplying by a smaller gain value, control system 32 may respond more slowly, or become less active. The gain value used may be selected based on machine testing criteria, machine performance criteria, and/or operator acceptance criteria. The inertial torque may be received by saturation block 85 (step 76).

Control system 32 may multiply deceleration limit 43 by torque producing system rotational inertia 40 in a multiplication block 81 (step 75). Deceleration limit 43 may control or limit torque producing system 21 as it transitions from its normal speed toward underspeed set point 38 when torque producing system 21 reaches its maximum torque producing output, but torque consuming devices 30 require more power. This may include setting a target deceleration rate for torque producing system 21 based on deceleration limit 43, and ensuring that the deceleration rate for torque producing system 21 does not decay at a rate greater than the target deceleration rate. The product of deceleration limit 43 and torque producing system rotational inertia 40 may be received by saturation block 85 (step 76).

Saturation block 85 may recognize the value from summation junction 86 as being an upper limit, the value from multiplication block 81 as being a lower limit, and the value from gain junction 83 as being a signal or value that may require limiting. Saturation block 85 may allow the value in gain junction 83 to vary freely between the upper limit and the lower limit. However, when the value in gain junction 83 reaches either the upper limit or the lower limit, saturation block 85 may saturate or clip the value from gain junction 83 (step 77) to ensure that the value leaving saturation block 85 is within a desired range.

The saturated value from saturation block 85 may be subtracted from the value in summation junction 86, in a summation junction 84 (step 78). The value in summation junction 84 may be recognized as being torque load limit 42 (step 79). By clipping the value from gain junction 83, control system 32 may be capable of maintaining a desired delta between the output at summation junction 86 (error-compensated torque) and torque load limit 42. If the value from saturation block 85 is a negative value, torque load limit 42 will be greater than the error-compensated torque, since subtracting a negative value is equivalent to adding a positive value to the error-compensated torque. If that is the case, control system 32 may recognize that torque producing system 21 may be capable of handling a larger load. If, on the other hand, the value from saturation block 85 is a positive value, then torque load limit 42 will be less than the error-compensated torque from summation junction 86, since a positive value is being subtracted from the error-compensated torque. In that case, control system 32 may recognize that the load on torque producing system 21 should not be increased. Method 51 may run continuously as machine 10 runs, calculating and updating torque load limit 42 as input values change, and may end (step 65) when machine 10 is turned off.

Industrial Applicability

The disclosed control system 32 may have applicability in assemblies having one or more torque producing devices 24 configured to produce torque for one or more torque consuming devices 30. Control system 32 may have particular applicability in determining torque load limits for torque producing systems 20 in a machine 10, based on the operation of torque producing devices 24 and torque consuming devices 30.

When a torque load on a torque producing system 21 is excessive, the speed of torque producing system 21 may decrease to or fall below its underspeed set point, causing torque producing system 21 to be more susceptible to stalling. Control system 32 may prevent this type of over-loading by determining a torque load limit that torque producing system 21 can handle without stalling, and setting limits on torque load, or on torque producing system operation in general, to keep torque producing system 21 operating at a target speed and/or in an acceptable range. For example, the amount of torque associated with the torque load limit, and no more, may be distributed between torque consuming devices 30. As long as the torque load exerted by torque consuming devices 30 is less than or equal to the torque load limit, torque producing system 21 may remain at or above its underspeed set point.

Errors associated with elements in machine 10 may give rise to inaccuracies with respect to the torque consumed by torque consuming devices 30, and the torque produced by torque producing system 20. Errors in torque values may be caused by production tolerances, variations in fuel quality, environmental conditions, and the like. Additionally or alternatively, if elements of machine 10 are removed or added without updating control system 32 (or otherwise making control system 32 aware) as to the changes, discrepancies may arise that may cause error. For example, accessory systems or parts installed aftermarket may be added to a machine whose original configuration did not include those systems or parts. Or, existing machines may be retrofitted with new systems or parts. In any case, control system 32 may identify if there is any torque error that may cause the torque limit to be inaccurate. If there is torque error, control system 32 may adjust the torque limit accordingly. By reducing the likelihood of stalling, control system 32 may provide for efficient, reliable, and robust machine operation at job sites. By using torque as the basis for controlling machine operation, inefficiency and delayed responses associated with speed and/or acceleration based controls may be avoided.

Furthermore, by maintaining a desired delta between the output at a summation junction 86 and a torque load limit 42, control system 32 may control, set, and adjust, the rate of speed decay. Controlling the rate of speed decay may provide improved control over torque producing system performance, use of the full lug curve of torque producing system 21, and the ability to accelerate torque producing system 21 to a set point without requiring the burning of excess fuel to drive the acceleration. As a result, more of the capability of torque producing system 21 can be utilized. For example, if a machine allows its torque consuming devices to exert a torque load that causes the machine's engine to all below the engine's underspeed set point, then getting the engine's speed back to the underspeed set point may require a quick burning of fuel to accelerate the engine. One way to avoid this situation may be to always keep the engine at a predetermined set point above its underspeed set point, so that an increase in the load on the engine will not drop the engine speed past the underspeed set point. Thus, the engine may have a rated capacity, corresponding to the predetermined set point, that should not be exceeded. This rated capacity may be below an actual operating capacity of the engine, and thus, the engine's capacity lying between the rated capacity and the actual operating capacity, may remain unused. This may be inefficient. For one thing, the range of engine speeds between the underspeed set point and the predetermined set point may be underutilized. Control system 32, by controlling the torque load on torque producing system 21, allows torque producing system 21 to operate at a full range of speeds above its underspeed set point, without fear of an unexpected spike in torque load driving the speed of torque producing system 21 below the underspeed set point.

Torque consuming devices 30 that are capable of exerting a combined torque load on torque producing system 21 exceeding the rated capabilities of torque producing system 21, or even the actual operating capacity of torque producing system 21, may be used, since control system 32 may ensure that stalling or other detriments to machine performance will not occur by limiting how much of a torque load torque consuming devices 30 may exert at any one time. This may allow a single torque consuming device to be used across machine platforms, regardless of the torque load it exerts, since control system 32 may prevent that torque consuming device from using an excessive amount of torque. Economic benefits may be associated with the large scale production of a single component usable on multiple machines.

Additionally, control system 32 may control the torque load on torque producing system 21 to prevent sudden changes in the torque producing system speed that would otherwise result from sudden or unexpected increases in the torque load. Control system 32 may accomplish this by sensing that the torque load requested by torque consuming devices 30 has changed, and preventing the change from immediately affecting torque producing system 21. For example, if torque producing system 21 is operating at an initial speed of 1,000 rpm when there is a sudden increase in torque requested by torque consuming devices 30, control system 32 may prevent some or all of the torque requested from being delivered to torque consuming devices 30 as control system 32 instructs torque producing system 21 to increase its speed. As torque producing system 21 accelerates, some or all of the torque requested may be delivered, such that a resultant speed of torque producing system 21 may be maintained at or around 1,000 rpm, even with the increased torque load. It should be understood that control system 32 may not maintain the speed at a value, but may instead control the torque load such that the resultant speed (target speed) is higher or lower than the initial speed. The point is that control system 32 has the ability to set and adjust engine speed with precision, substantially unaffected by variations in the amount of torque load.

Existing machines that do not have a control system or torque consuming devices capable of operating in the manner described with respect to control system 32 and torque consuming devices 30, may be retrofitted to have such capabilities. For example, the control system of an existing machine may be replaced with control system 32, or control system 32 may be added in whole or in part to the existing machine. Additionally or alternatively, one or more of the torque consuming devices on an existing machine may be replaced with one or more of torque consuming devices 30, or one or more of torque consuming devices 30 may be added to the existing machine.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A machine comprising:
   a torque producing system;
   one or more torque consuming devices operable to exert a torque load on the torque producing system;
   a control system coupled to the torque producing system and the one or more torque consuming devices, the control system configured to limit operation of the one or more torque consuming devices to prevent a speed of the torque producing system from falling below a predetermined speed, the control system including a torque error estimator, and one or more electronic devices operable to sense operating conditions of the torque producing system and the one or more torque consuming devices, and provide torque data to the control system based on the sensed operating conditions, the torque error estimator being operable to compensate for error in the torque data.

2. The machine of claim 1, wherein the error is at least partially caused by inaccuracy of the one or more electronic devices.

3. The machine of claim 2, wherein the error is at least partially caused by the one or more electronic devices being incapable of sensing the operating conditions of an additional torque consuming device.

4. The machine of claim 2, wherein the control system is operable to calculate a torque load limit with the torque data.

5. An electronic control module including instructions for performing a method, the method comprising:

obtaining input signals related to at least one of a torque producing system and a torque consuming device;

calculating an initial error value indicative of error associated with at least one of the torque producing system and the torque consuming device based on the input signals;

subtracting a feedback value from the initial error value to calculate a modified error value; and adjusting the modified error value to produce an adjusted error value used to control operation of the torque consuming device to thereby prevent a reduction in a speed of the torque producing system below a predetermined speed.

6. The electronic control module of claim 5, wherein the adjusted error value becomes a new feedback value.

7. The electronic control module of claim 5, wherein the adjusted error value is used to adjust a torque load limit for the torque producing system.

8. The electronic control module of claim 5, wherein the input signals include torque data for at least one of the torque producing system and the torque consuming device.

9. The electronic control module of claim 5, wherein the adjusted error value is used to set a limit on a torque load exerted by the torque consuming device on the torque producing system.

10. A machine comprising:

a torque producing system;

torque consuming devices operable to exert a torque load on the torque producing system;

a control system operable to determine a torque load limit for the torque producing system, the control system being in communication with the torque producing system, communicatively linked to one or more first torque consuming devices, uncommunicative with one or more second torque consuming devices, operable to calculate torque consumed by the one or more first torque consuming devices based at least in part on communications from the one or more first torque consuming devices and on an amount of torque being produced by the torque producing system, and calculate torque consumed by the one or more second torque consuming devices based on sensed operating conditions of the machine, control an operation of the one or more first and the one or more second torque consuming devices based on the torque limit, and operable to prevent a speed of the torque producing system from falling below a predetermined speed.

11. The machine of claim 10, wherein the control system is operable to take into account the torque consumed by the one or more first torque consuming devices, and the torque consumed by the one or more second torque consuming devices, to determine the torque load limit.

12. The machine of claim 10, wherein the control system is operable to maintain the torque load at or below the torque load limit.

13. The machine of claim 10, wherein the control system is communicatively linked to the one or more first torque consuming devices by one or more sensors operable to sense operating conditions of the one or more first torque consuming devices.

14. A non transitory electronic control module including instructions for performing a method, the method comprising:

determining an amount of available torque currently available from a torque producing system;

determining a torque load limit for the torque producing system based on the determined amount of available torque currently available and an operating speed of the torque producing system, including determining the torque load limit in a manner to prevent the operating speed from decaying at a rate greater than a target deceleration rate; and controlling one or more torque consuming devices that receive torque from the torque producing system based on the torque load, wherein determining the torque load limit includes determining an inertial torque based on the difference between the operating speed and the underspeed set point.

15. The non-transitory electronic control module of claim 14, wherein determining the torque load limit includes determining a difference between the operating speed and an underspeed set point of the torque producing system.

16. The non-transitory electronic control module of claim 14, wherein determining the torque load limit includes adjusting the torque load limit based on the inertial torque.

17. The non-transitory electronic control module of Claim 16, wherein determining the torque load limit includes limiting the inertial torque to a target range to prevent the operating speed from decaying at a rate greater than the target deceleration rate.

* * * * *

UNITED STATES PATENT AND TRADEMARK OFFICE
CERTIFICATE OF CORRECTION

| | |
|---|---|
| PATENT NO. | : 8,793,002 B2 |
| APPLICATION NO. | : 12/213527 |
| DATED | : July 29, 2014 |
| INVENTOR(S) | : Anderson et al. |

It is certified that error appears in the above-identified patent and that said Letters Patent is hereby corrected as shown below:

In the Specification,

Column 10, line 56, delete "Industrial Applicability" and insert -- INDUSTRIAL APPLICABILITY --.

In the Claims,

Column 14, line 27, in Claim 14, delete "Anon transitory" and insert -- A non-transitory --.

Column 14, lines 54-55, in Claim 17, delete "Claim 16," and insert -- claim 16, --.

Signed and Sealed this
Fifteenth Day of September, 2015

Michelle K. Lee
*Director of the United States Patent and Trademark Office*